July 5, 1949. H. McKEE 2,475,192
DEVICE FOR CATCHING AND HANDLING FARM ANIMALS
Filed Jan. 3, 1946

Inventor
HARVEY McKEE
By Loster L Sargent
Attorney

Patented July 5, 1949

2,475,192

UNITED STATES PATENT OFFICE 2,475,192

DEVICE FOR CATCHING AND HANDLING FARM ANIMALS

Harvey McKee, Montfort, Wis.

Application January 3, 1946, Serial No. 638,845

1 Claim. (Cl. 119—154)

It is the object of my invention to provide a novel and easily operated device for catching and handling farm animals. I attain the objects of my invention by the mechanism illustrated in the accompanying drawings in which—

Like numerals designate like parts in each of the several views.

Figure 1:
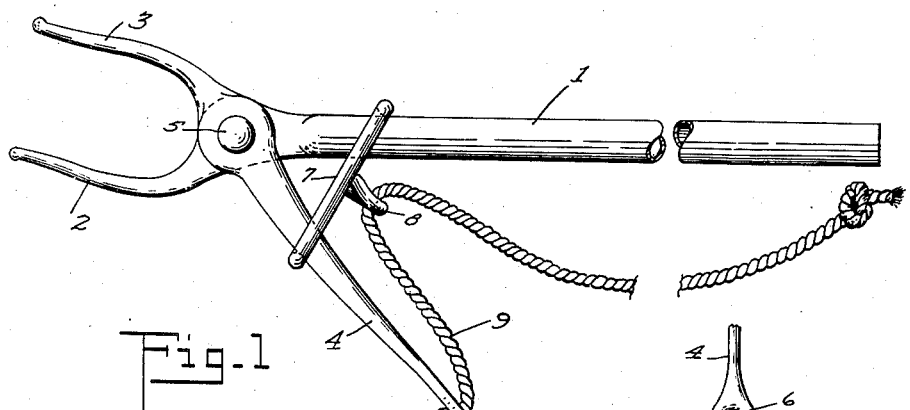
Figure 1 is a side elevation of my device in open position.
Figure 2:
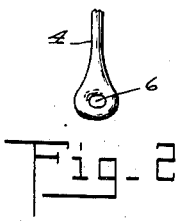
Fig. 2 is a detail view of the end portion of the rope-controlled arm.
Figure 3:
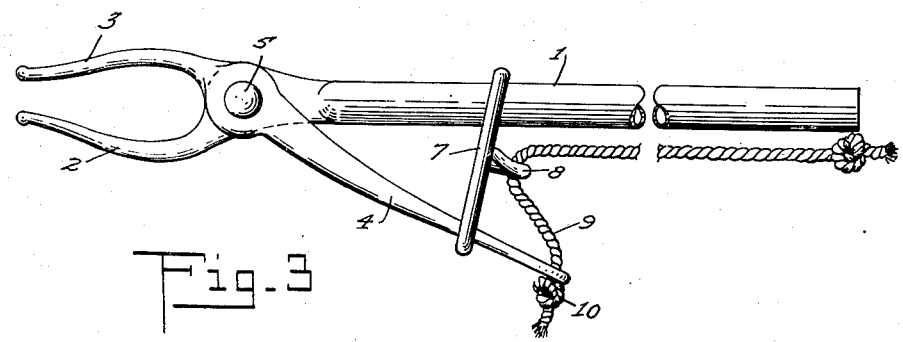
Fig. 3 is a side elevation of the device in closed position.
Figure 4:
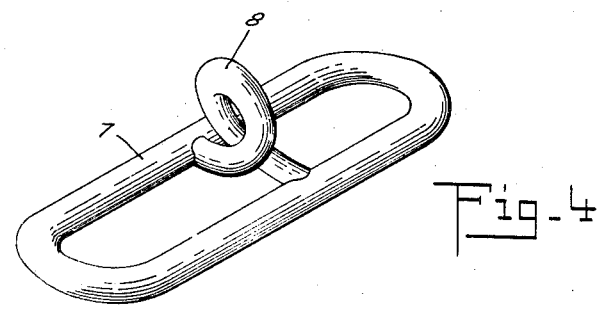
Fig. 4 is a perspective view of the slidable link.

Referring to the accompanying drawings, I provide a long handle 1 on the end of which is formed a curved jaw 2. Opposed to jaw 2 is a similar curved jaw which terminates in an arm 4. This arm 4 is pivotally mounted on the handle 1 by suitable pivot means 5. The outer end of arm 4 is provided with an eye 6. A link or actuating rang 7 encircles the arm 4 and the handle 1 and is slidable thereon so as to close the jaws and lock them against outward movement, as will be hereinafter more fully described. A loop 8 is affixed to the central portion of the link 7. A rope 9, which has a knot 10 in its end extends through the eye 6 and thence through the loop 8 of link 7 to control the position of the link 7 and thence extends along the handle 1 and is held by the operator. It will be noted that the ends of jaws 2 and 3 have the points turned out slightly, whereby due to the curvature, the points will slide over and will not injure the animal caught. It will also be noted that links 7 is a rigid connection between the arms 1 and 4 and there will be no slacking or give when the person using the device relaxes his hold on the rope.

With my link it is possible to open up the jaws of the device by slacking off on the rope and giving the device a shake. This makes the link slide back toward the pivot 5 and allows the jaws to open. Whenever there is a pull on the rope it draws the link farther up on the handle. The link remains in its raised position and locks the jaws against outward movement until the rope is slacked off and the device given a shake.

What I claim is:

A device for catching and handling farm animals comprising a pair of pivotally connected jaws one of which is provided with a relatively long handle and the other of which is provided with a relatively short operating arm, a rigid actuating ring encircling said handle and arm, a looped portion on said ring transversely disposed intermediate the extremities thereof, and a flexible operating member extending through said looped portion, the inner extremity thereof being secured to the extremity of the operating arm, whereby tension upon said operating member will move the actuating ring away from the pivotal connection so as to close the jaws and lock the same against outward movement.

HARVEY McKEE.

REFERENCES CITED

The following references are of record in the file of this patent:

UNITED STATES PATENTS

| Number | Name | Date |
|---|---|---|
| 390,331 | Anable | Oct. 2, 1888 |
| 902,057 | Cruse | Oct. 27, 1908 |